(12) United States Patent
Nunnally

(10) Patent No.: US 6,655,840 B2
(45) Date of Patent: Dec. 2, 2003

(54) STIFF CROSS ROLLER BEARING CONFIGURATION

(75) Inventor: Mullard A. Nunnally, Anaheim, CA (US)

(73) Assignee: Newport Corporation, Irvine, CA (US)

( * ) Notice: Subject to any disclaimer, the term of this patent is extended or adjusted under 35 U.S.C. 154(b) by 22 days.

(21) Appl. No.: 09/782,920

(22) Filed: Feb. 13, 2001

(65) Prior Publication Data

US 2002/0110293 A1 Aug. 15, 2002

(51) Int. Cl.[7] ............................................. F16C 19/00
(52) U.S. Cl. ........................................................ 384/51
(58) Field of Search ............................ 384/51, 54, 56, 384/17, 23

(56) References Cited

U.S. PATENT DOCUMENTS

| | | |
|---|---|---|
| 1,143,165 A | 6/1915 | Begusch |
| 1,306,906 A | 6/1919 | Jaques, Sr. |
| 2,367,139 A | 1/1945 | Ress |
| 3,357,268 A | 12/1967 | Richter |
| 3,442,475 A | 5/1969 | Rivin |
| 3,460,786 A | 8/1969 | Rivin |
| 3,478,608 A | 11/1969 | Met |
| 3,533,012 A | 10/1970 | Johnson et al. |
| 3,565,515 A | 2/1971 | De Mey, II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |
| 3,751,025 A | 8/1973 | Beery et al. |
| 3,778,121 A | 12/1973 | Levesque |
| 3,917,201 A | 11/1975 | Roll |
| 3,945,246 A | 3/1976 | Wadensten |
| 4,030,811 A | 6/1977 | Khoe et al. |
| 4,065,203 A | 12/1977 | Goell et al. |
| 4,079,404 A | 3/1978 | Comerford et al. |

(List continued on next page.)

FOREIGN PATENT DOCUMENTS

| | | |
|---|---|---|
| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1, No. 7, Jul. 1989.

P. Zorabedian and W. R. Trutna, Jr., "Interference–filter–tuned, alignment–stabilized, semiconductor external–cavity laser", 1988, Optical Society of America.

A. Schremer and C. L. Tang, "Single–Frequency tunable external–cavity semiconductor laser using an electro–optic birefringent modulator", Appl. Phys. Lett., vol. 55, No. 1, Jul. 3, 1989.

(List continued on next page.)

Primary Examiner—Jack Lavinder
Assistant Examiner—Benjamin A Pezzlo
(74) Attorney, Agent, or Firm—Irell & Manella LLP

(57) ABSTRACT

A translation table with a pair of bearing assemblies located between a first element and a second element. Each bearing assembly has a pair of roller bearings located at one end of a bearing separator strip, and another pair of roller bearings located at an opposite end of the separator strip. There are no bearings located between the outer pairs of roller bearings. Providing a roller bearing assembly with no roller bearings in the inner portion of the separator strip creates a relatively stiff bearing assembly.

11 Claims, 1 Drawing Sheet

U.S. PATENT DOCUMENTS

| | | |
|---|---|---|
| 4,088,396 A | 5/1978 | Edelstein |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,199,222 A | 4/1980 | Ikushima et al. |
| 4,237,474 A | 12/1980 | Ladany |
| 4,268,113 A | 5/1981 | Noel, Jr. |
| 4,295,152 A | 10/1981 | Khoe et al. |
| 4,296,998 A | 10/1981 | Dufft |
| 4,316,678 A | 2/1982 | F'Geppert |
| 4,332,469 A | 6/1982 | Wendland |
| 4,350,867 A | 9/1982 | Kinoshita et al. |
| 4,355,323 A | 10/1982 | Kock |
| 4,357,072 A | 11/1982 | Goodfellow et al. |
| 4,387,956 A | 6/1983 | Cline |
| 4,403,243 A | 9/1983 | Hakamada |
| 4,435,037 A | 3/1984 | Abramson et al. |
| 4,469,399 A | 9/1984 | Cowen et al. |
| 4,469,929 A | 9/1984 | Rosen et al. |
| 4,479,698 A | 10/1984 | Landis et al. |
| 4,500,165 A | 2/1985 | Scholl et al. |
| 4,506,108 A | 3/1985 | Kersch et al. |
| 4,523,802 A | 6/1985 | Sakaguchi et al. |
| 4,523,810 A | 6/1985 | Goss et al. |
| 4,525,659 A | 6/1985 | Imahashi et al. |
| 4,550,410 A | 10/1985 | Chenausky et al. |
| 4,615,031 A | 9/1986 | Eales et al. |
| 4,623,220 A | 11/1986 | Grabbe et al. |
| 4,647,147 A | 3/1987 | Pikulski et al. |
| 4,647,331 A | 3/1987 | Koury, Jr. et al. |
| 4,657,429 A | 4/1987 | Morris |
| 4,664,732 A | 5/1987 | Campbell et al. |
| 4,673,244 A | 6/1987 | Miles |
| 4,673,245 A | 6/1987 | Kling et al. |
| 4,677,290 A | 6/1987 | Mitch |
| 4,678,271 A | 7/1987 | Beaulieu |
| 4,679,908 A | 7/1987 | Goodwin |
| 4,697,935 A | 10/1987 | Yasui |
| 4,701,013 A | 10/1987 | Jurczyszyn et al. |
| 4,702,556 A | 10/1987 | Ishii et al. |
| 4,708,429 A | 11/1987 | Clark et al. |
| 4,714,315 A | 12/1987 | Krause |
| 4,720,163 A | 1/1988 | Goodwin et al. |
| 4,746,195 A | 5/1988 | Auracher et al. |
| 4,747,657 A | 5/1988 | Chaoui et al. |
| 4,748,632 A | 5/1988 | Preston |
| 4,755,065 A * | 7/1988 | Walter et al. .................. 384/47 |
| 4,759,600 A | 7/1988 | Caron et al. |
| 4,763,979 A | 8/1988 | Heywang |
| 4,767,174 A | 8/1988 | Carenco et al. |
| 4,773,730 A | 9/1988 | Sedlmayr |
| 4,779,946 A | 10/1988 | Pimpinella et al. |
| 4,779,959 A | 10/1988 | Saunders |
| 4,782,223 A | 11/1988 | Suzuki |
| 4,787,691 A | 11/1988 | Lorenzo et al. |
| 4,800,262 A | 1/1989 | Lentine |
| 4,807,750 A | 2/1989 | Ryder et al. |
| 4,823,220 A | 4/1989 | Milster et al. |
| 4,837,768 A | 6/1989 | Schmid |
| 4,842,397 A | 6/1989 | Eisler |
| 4,850,261 A | 7/1989 | Greene |
| 4,850,671 A | 7/1989 | Finzel |
| 4,854,667 A | 8/1989 | Ebata et al. |
| 4,913,527 A | 4/1990 | Jessop |
| 4,914,867 A | 4/1990 | Saito et al. |
| 4,915,482 A | 4/1990 | Collins et al. |
| 4,916,635 A | 4/1990 | Singer et al. |
| 4,938,564 A | 7/1990 | Romero |
| 4,966,474 A | 10/1990 | Geiger |
| 4,978,910 A | 12/1990 | Knox et al. |
| 4,988,159 A | 1/1991 | Turner et al. |
| 4,988,165 A | 1/1991 | Ishii et al. |
| 5,000,415 A | 3/1991 | Sandercock |
| 5,022,768 A * | 6/1991 | Baxter .......................... 384/19 |
| 5,044,719 A | 9/1991 | Nakamura |
| 5,058,124 A | 10/1991 | Cameron et al. |
| 5,062,012 A | 10/1991 | Maeda et al. |
| 5,068,749 A | 11/1991 | Patel |
| 5,077,747 A | 12/1991 | Hemmer et al. |
| 5,132,824 A | 7/1992 | Patel et al. |
| 5,138,496 A | 8/1992 | Pong |
| 5,140,470 A | 8/1992 | Luecke |
| 5,146,532 A | 9/1992 | Hodge |
| 5,150,236 A | 9/1992 | Patel |
| 5,172,160 A | 12/1992 | Van Eijk et al. |
| 5,179,618 A | 1/1993 | Anton |
| 5,183,350 A | 2/1993 | Kramer |
| 5,189,725 A | 2/1993 | Bensel, III et al. |
| 5,191,587 A | 3/1993 | Hanson et al. |
| 5,194,993 A | 3/1993 | Bedzyk |
| 5,214,735 A | 5/1993 | Henneberger et al. |
| 5,218,258 A | 6/1993 | Shirasu et al. |
| 5,218,610 A | 6/1993 | Dixon |
| 5,219,051 A | 6/1993 | Davis |
| 5,248,203 A * | 9/1993 | Agari .......................... 384/49 |
| 5,251,863 A | 10/1993 | Gossman et al. |
| 5,285,995 A | 2/1994 | Gonzalez et al. |
| 5,289,559 A | 2/1994 | Wilson |
| 5,300,755 A | 4/1994 | Nishitani et al. |
| 5,311,278 A | 5/1994 | Rosencher |
| 5,319,435 A | 6/1994 | Melle et al. |
| 5,321,539 A | 6/1994 | Hirabayashi et al. |
| 5,327,061 A | 7/1994 | Gullapalli |
| 5,337,383 A | 8/1994 | DeAngelis et al. |
| 5,367,140 A | 11/1994 | Jonaneh et al. |
| 5,410,145 A | 4/1995 | Coroy |
| RE34,981 E * | 6/1995 | Mottate ....................... 384/47 |
| 5,427,454 A * | 6/1995 | Tsuboi ......................... 384/47 |
| 5,428,225 A | 6/1995 | Silva et al. |
| 5,428,635 A | 6/1995 | Zhiglinsky et al. |
| 5,434,944 A | 7/1995 | Kerry et al. |
| 5,434,945 A | 7/1995 | Burek et al. |
| 5,446,519 A | 8/1995 | Makinouchi |
| 5,463,647 A | 10/1995 | Pan |
| 5,469,265 A | 11/1995 | Measures et al. |
| 5,499,261 A | 3/1996 | Welch et al. |
| 5,502,598 A | 3/1996 | Kimura et al. |
| 5,528,718 A | 6/1996 | Ray et al. |
| 5,530,547 A | 6/1996 | Arnold |
| 5,530,785 A | 6/1996 | Sakamoto et al. |
| 5,549,391 A * | 8/1996 | Engbersen et al. ........... 384/51 |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |
| 5,619,609 A | 4/1997 | Pan et al. |
| 5,638,267 A | 6/1997 | Singhose et al. |
| 5,638,482 A | 6/1997 | Winterhoff et al. |
| 5,653,317 A | 8/1997 | Wakui |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |
| 5,711,611 A * | 1/1998 | Nagai et al. .................. 384/50 |
| 5,717,804 A | 2/1998 | Pan et al. |

| | | |
|---|---|---|
| 5,725,066 A | 3/1998 | Beard et al. |
| 5,737,132 A | 4/1998 | Luecke et al. |
| 5,745,633 A | 4/1998 | Giebel et al. |
| 5,748,821 A | 5/1998 | Schempp et al. |
| 5,751,877 A | 5/1998 | Ishizaka et al. |
| 5,757,561 A | 5/1998 | Sechrist et al. |
| 5,758,004 A | 5/1998 | Alarcon et al. |
| 5,761,360 A | 6/1998 | Grois et al. |
| 5,765,800 A | 6/1998 | Watanabe et al. |
| 5,774,614 A | 6/1998 | Gilliland et al. |
| 5,793,920 A | 8/1998 | Wilkins et al. |
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,927,858 A * | 7/1999 | Agari .......................... 384/45 |
| 5,930,057 A | 7/1999 | Sechrist et al. |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,198,580 B1 | 3/2001 | Dallakian |
| 6,209,841 B1 | 4/2001 | Houghton, Jr. et al. |
| 6,276,830 B1 * | 8/2001 | Edelmann et al. ............. 384/51 |
| 6,352,367 B1 * | 3/2002 | Konomoto et al. ........... 384/45 |

OTHER PUBLICATIONS

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength–Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot inteferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal Of Lightwave Technology, vol. LT–5. No. 4, Apr. 1987.

Hecht Optics Second Edition, Eugene Hecht, reprinted 1990, reference text, pp. 303 # 368.

Rivin, Eugene I., "Vibration isolation of precision equipment", Precision Engineering, 1995, pp. 41–56, vol. 17.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

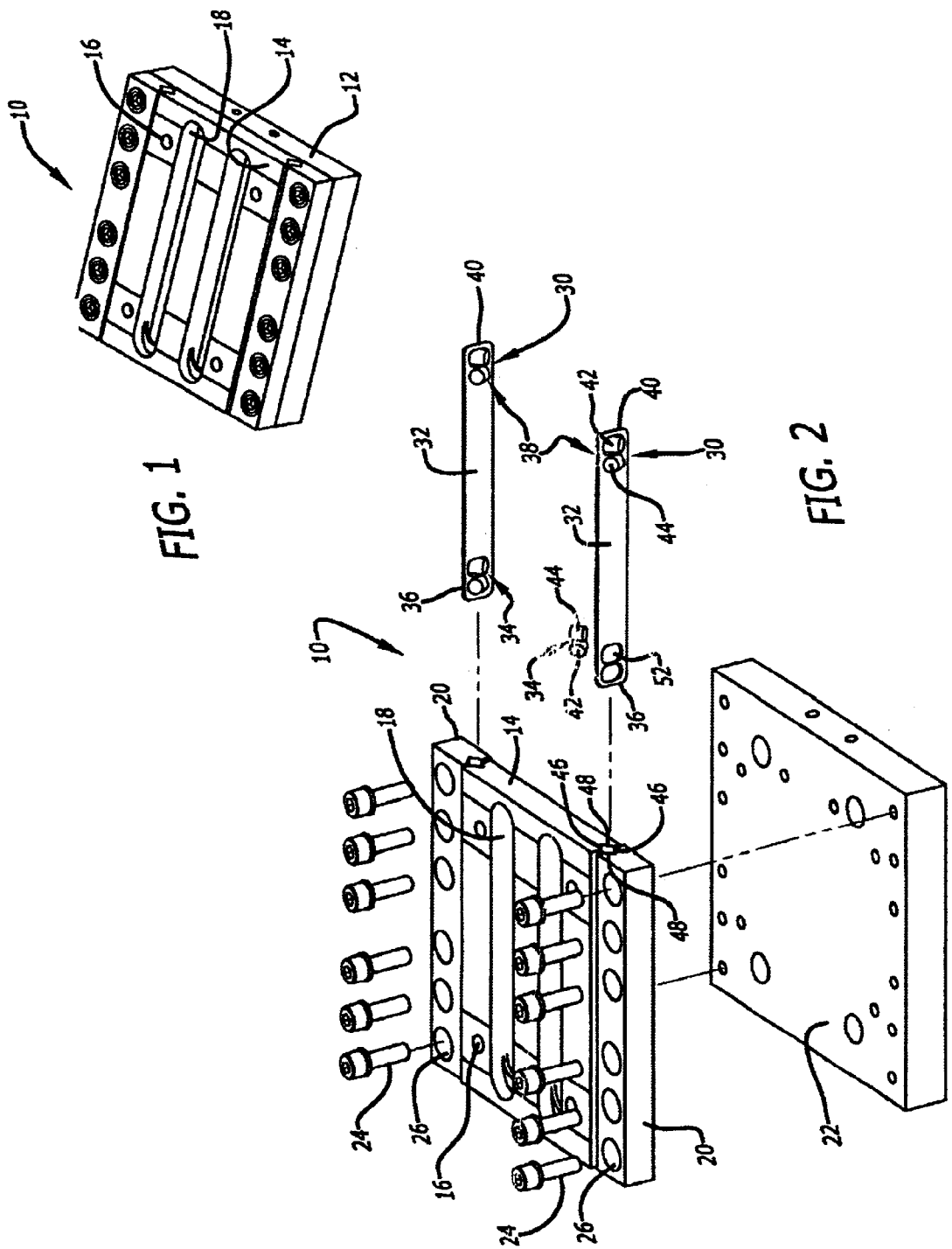

STIFF CROSS ROLLER BEARING CONFIGURATION

BACKGROUND OF THE INVENTION

1. Field of the Invention

The present invention relates to a cross roller bearing assembly that can be integrated into a mechanical translator table.

2. Background Information

Translation tables typically have a platform that can be moved relative to a stationary substrate. The table can provide a means to accurately move one object relative to another object. For example, in optical test benches, an optical component such as a focusing mirror, lens, etc. can be attached to the sliding platform of a translator. The platform may be attached to a micrometer that can be manipulated by an operator to vary the location of the optical component relative to the bench. The movement of the component may vary an optical characteristic such as the reflection angle, focus point, etc. of a light beam.

The translation table typically has a number of bearings located between the platform and the stationary substrate, to minimize friction between the two parts. The bearing assembly of a translation table typically includes a plurality of roller bearings located across the entire length of a bearing separator strip. Because of manufacturing tolerances it has been found that the roller bearings in the middle portion of the bearing separator strip may be larger than bearings located at the outer ends of the strip. This may cause the platform to teeter about the middle portion of the bearing assembly. Such a situation reduces the stiffness of the bearing assembly. The reduction in stiffness lowers the accuracy of the platform. The reduction in accuracy may be particularly critical when used in an optical bench where nanometer resolution is desired.

BRIEF SUMMARY OF THE INVENTION

A bearing assembly that has a first pair of roller bearings located at a first end of a bearing separator strip and a second pair of roller bearings at a second end of the separator strip. The pairs of roller bearings are separated by a portion of the bearing separator strip that has no roller bearings.

BRIEF DESCRIPTION OF THE DRAWINGS

FIG. 1 is a perspective view of a translation table of the present invention;

FIG. 2 is an exploded view of the translation table.

DETAILED DESCRIPTION OF THE PREFERRED EMBODIMENT

In general the present invention includes a translation table with a pair of bearing assemblies located between a first element and a second element. Each bearing assembly has a pair of roller bearings located at one end of a bearing separator strip, and another pair of roller bearings located at an opposite end of the separator strip. There are no bearings located between the outer pairs of roller bearings. Providing a roller bearing assembly with no roller bearings in the inner portion of the separator strip creates a relatively stiff bearing assembly. The second element can slide along the outer pairs of roller bearings without teetering about oversized middle bearings as was found in the prior art.

Referring to the drawings more particularly by reference numbers, FIGS. 1 and 2 show an embodiment of a translation table 10 of the present invention. The translation table 10 may include a first element 12 and a second element 14. The second element 14 may be a platform that can move relative to the first element 12. The second element 14 may have one or more threaded apertures 16 and slots 18.

The threaded apertures 16 and slots 18 allow mechanical components to be attached to the second element 14. For example, an optical mounting post (not shown) may be screwed into a threaded aperture 16 and attached to the second element 14. The post can be moved relative to the first element 12 by sliding the second element 14. Although not shown, an actuator such as a micrometer can be attached to the second element 14 and manipulated to move the element 14.

The first element 12 may include a pair of bearing outer ways 20 that are attached to a substrate 22 by a plurality of fasteners 24. The fasteners 24 may extend through counter-bored clearance holes 26 in the outer ways 20. Constructing the first element 12 as separate parts reduces the complexity of manufacturing the table 10.

The translation table 10 may have a pair of roller bearing assemblies 30. Each assembly 30 may include a bearing separator strip 32. Each assembly also includes a first pair of roller bearings 34 located at one end 36 of a separator strip 32 and a second pair of roller bearings 38 located at an opposite end 40 of the strip 32.

Each pair of roller bearings includes an outer roller bearing 42 located at a first oblique angle and an inner roller bearing 44 located at second oblique angle. The second oblique angle typically being located 90 degrees relative to the first angle. The inner roller bearings 44 roll relative to opposing bearing surfaces 46 of the first 12 and second 14 elements. The outer roller bearings 42 roll along opposing bearings surface 48 of the first 12 and second 14 elements. Providing crossed roller bearings, bearings oriented 90 degrees relative to each other, provides a bearing assembly that is relatively stiff in the yaw, pitch and roll directions.

The roller bearings 42 and 44 are located within corresponding apertures 52 in the separator strips 32. The strips 32 may be coupled to the first element 12 by stop pins (not shown) that prevent the bearings 42 and 44 from rolling out of the table 10.

In operation, the second element 14 is moved relative to the first element 12. Moving the second element 14 causes the element 12 to slide along the roller bearings 42 and 44. It has been found that providing pairs of roller bearings 42 and 44 only at the outer ends of the separator strips 32, and not in the middle portions of the strips 32, increases the stiffness of the bearing assemblies 30.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A roller bearing assembly that is located between a first element and a second element, comprising:

a bearing separator strip that has a first end and a second end;

a first pair of roller bearings located at said first end of said bearing separator strip; and, a second pair of roller bearings located at said second end of said bearing separator strip, said second pair of roller bearings being separated from said first pair of roller bearings by inner portion of said bearing separator strip that has no roller bearings and is not in contact with or mechanically coupled to the first and second elements, said inner portion having a distance that is greater than a spacing between adjacent roller bearings.

2. The bearing assembly of claim 1, wherein said first and second pairs of roller bearings each include an outer roller bearing oriented at a first oblique angle and an inner roller bearing oriented at a second oblique angle.

3. A translation table, comprising:

a first element;

a second element that can move relative to said first element;

a first bearing separator strip that has a first end and a second end, said first bearing separator strip being located between said first and second elements;

a first pair of roller bearings located at said first end of said first bearing separator strip; and, a second pair of roller bearings located at said second end of said first bearing separator strip, said second pair of roller bearings being separated from said first pair of roller bearings by an inner portion of said first bearing separator strip that has no roller bearings and is not in contact with or mechanically coupled to said first and second elements, said inner portion having a distance that is greater than a spacing between adjacent roller bearings.

4. The table of claim 3, wherein said first and second pairs of roller bearings each include an outer roller bearing oriented at a first oblique angle and an inner roller bearing oriented at a second oblique angle.

5. The table of claim 3, further comprising a second bearing separator strip that has a first end and a second end, said second bearing separator strip being located between said first and second elements, a third pair of roller bearings located at said first end of said second bearing separator strip, and a fourth pair of roller bearings located at said second end of said second bearing separator strip, said fourth pair of roller bearings being separated from said third pair of roller bearings by a portion of said second bearing separator strip that has no roller bearings.

6. The table of claim 5, wherein said third and fourth pairs of roller bearings each include an outer roller bearing oriented at a first oblique angle and an inner roller bearing oriented at a second oblique angle.

7. The table of claim 3, wherein said second element includes a threaded aperture.

8. The table of claim 3, wherein said second element includes a slot.

9. The table of claim 3, wherein said first element includes a bearing outer way that is attached to a substrate.

10. The table of claim 3, wherein said first bearing separator strip has a plurality of apertures and said roller bearings are located within said apertures.

11. The table of claim 3, wherein said first bearing separator strip is coupled to said first element.

* * * * *